Dec. 28, 1948.  C. E. LIPUMA  2,457,479
SUNSHADE MOUNTING
Filed Feb. 21, 1944
FIG. 1
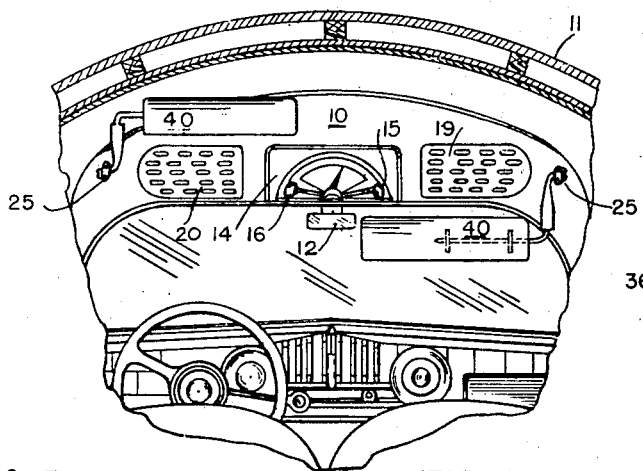
FIG. 2
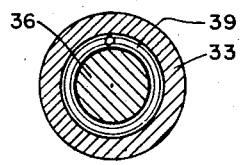
FIG. 3
FIG. 4
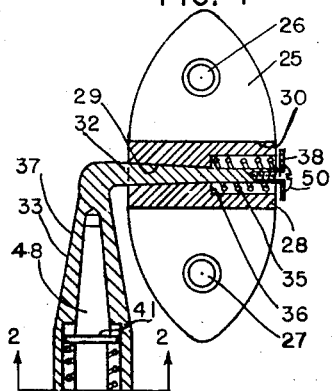
FIG. 5
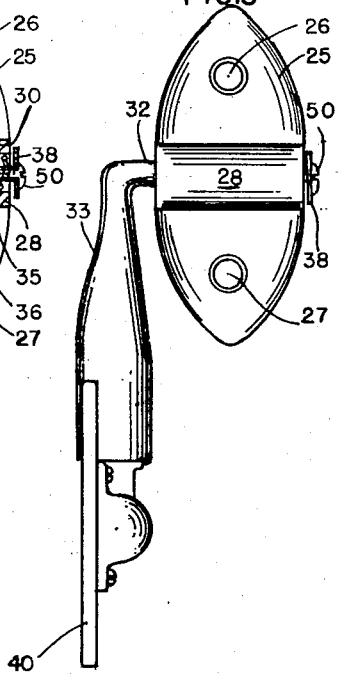
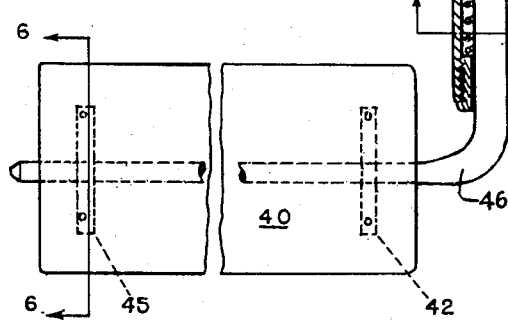
FIG. 6
INVENTOR
CHARLES E. LIPUMA
BY David M. Davis
HIS ATTORNEY Patented Dec. 28, 1948

2,457,479

UNITED STATES PATENT OFFICE 2,457,479

SUNSHADE MOUNTING

Charles E. Lipuma, Chicago, Ill., assignor to Zenith Radio Corporation, a corporation of Illinois Application February 21, 1944, Serial No. 523,224

4 Claims. (Cl. 296—97)

This invention relates to an improved shade arranged to be mounted in an automobile.

It is desirable to mount a radio receiver in an automobile where it is convenient to observe indications on the dials thereof and yet where it occupies a position not necessary for other purposes and where the receiver is not apt to be affected by extraneous, annoying radiations.

It is also desirable to mount a radio receiver in a vehicle, such as an automobile, in such a position that the antenna leads thereto are of shortest possible length whereby a low capacity antenna may be used to greater advantage. When so placed, mounting of the antenna is facilitated and the antenna lead in or antenna structure is less apt to impair the vision of the occupants of the vehicle.

It is also desirable to mount a radio receiver in a vehicle in such a manner that sound waves are directly transmitted to the listener without impairment due to reflections. These and other desirable features are attained when the radio receiver is mounted in the header space of an automobile in a manner shown and described in the copending application of Gilbert E. Gustafson, Serial No. 503,868, filed September 27, 1943, now Patent No. 2,392,665, dated Jan. 8, 1946, and assigned to the same assignee as the present application, the header space being defined by the roof of the automobile and decorative felt or cloth directly in front of a person when he is sitting in the driver's seat.

When conventional present day sunshades are mounted in an automobile having radio receiving apparatus mounted in the header space as shown in the above mentioned copending application, such sunshades interfere with and block sounds emanating from the receiver, detract somewhat from the appearance of the receiving apparatus which is compactly and artistically placed in the header space, and interfere with manual control of the receiver.

An object of the present invention, therefore, is to provide a sunshade arranged to be mounted in an automobile having radio receiving or other apparatus mounted in the header space.

A further object of the present invention is to provide an improved sunshade arranged to be mounted in an automobile having apparatus of artistic design in the header space so that the shade in its sun obscuring or retracted position does not detract from the appearance of such apparatus.

Still another object of the present invention is to provide a new and improved sunshade mounting.

The features of the present invention which are believed to be novel are set forth with particularity in the appended claims. This invention itself, both as to its organization and manner of operation, together with further objects and advantages thereof, may best be understood by reference to the following description taken in connection with the accompanying drawing in which:

Figure 1 shows apparatus embodying this invention mounted in an automobile, and

Figs. 2 to 6 inclusive, show detail views of the apparatus shown in Fig. 1, Figs. 2 and 6 being sectional views taken substantially on correspondingly numbered lines in Fig. 4, Fig. 4 being partly in section, and Fig. 3 being a view in elevation of a portion of the apparatus shown in Fig. 1.

A sunshade mounted in an automobile is accordance with the present invention may conveniently be moved to three positions, generally speaking, a first position being a retracted position wherein the sunshade is maintained adjacent the roof covering as shown on the left in Fig.1, a second position or sun obscuring position wherein the plane of the sunshade is substantially parallel to the plane of the windshield as shown on the right in Fig. 1, and a third position as shown in Fig. 5 wherein the plane of the sunshade extends substantially perpendicular to the plane of the front windshield so as to shield the occupants of the automobile from direct rays of sun passing through a side window of the automobile.

Referring to Fig. 1, a header enclosure member or plate 10 extends substantially the full width of an automobile, and upon that plate there is fixedly mounted a complete radio receiver placed between the metal roof 11 and header plate 10 as shown and described in the above mentioned copending application of Gilbert E. Gustafson. The space which the radio receiver occupies is usually called the header space and in the conventional present day automobile is a space defined by the roof of the automobile and the decorative felt or cloth directly in front of a person when he is sitting in the driver's seat. The radio receiver and its supporting means are positioned in the header space so as to give a pleasing appearance without sacrificing the space normally required for a conventional rear vision mirror 12.

In some applications it is preferred to mount all of the components of the radio receiver on the single unitary enclosure member or plate 10 which is preferably made of pleasing appearance. This plate 10 is easily mounted in and dismounted from the automobile.

The main operating elements of the conventional radio receiver, with the exception of an antenna and speaker, are mounted in a receiver unit occupying an area in the header space defined by the rectangle 14. Manual tuning means 15 and volume control means 16 project through plate 10 upon which the receiver unit is mounted.

The header plate 10, preferably of pleasing appearance, has a set of openings 19 comprising a sound opening which readily allows the passage of sound waves into the car from the front side of a conventional speaker mounted directly behind the set of openings 19.

A set of openings 20 through the left-hand side of plate 10 in Fig. 1 is symmetrically located with respect to the other set of openings 19 about an axis passing through the longitudinal center of the automobile so as to give the plate 10 a symmetrical and pleasing appearance. Also, since the header enclosure member or plate 10 closes off completely the space within which the speaker is located, it may be desirable to provide the openings 20 in plate 10 so that a listener may hear sound waves from the rear side of the speaker as well as from the front side for enhanced tone quality.

The sunshade proper includes a base member 25 having a pair of fastening openings 26 and 27 for fastening base member 25 to plate 10. Also, base member 25 has an enlarged cylindrical portion 28 with a conical shaped opening 29 terminating in an enlarged opening 30 for pivotally supporting and housing the conically shaped offset bearing member 32 of arm 33 and compression spring 35.

Compression spring 35, having one of its ends abutting against shoulder 36 and having its other end abutting against washer 38 held by screw 50 on offset bearing member 32, spring biases the conical offset bearing member 32 into positive engagement with the walls defining conical shaped opening 29 so that bearing member 32, although free to turn in base member 25, is held in adjusted position by frictional engagement of bearing member 32 in base member 25. It is thus seen that arm 33 may be moved manually to adjusted position with respect to base 25 which is fastened to header plate 10.

Connecting arm 33, in turn, rotatably and frictionally supports sunshade supporting arm 46. For this purpose, arm 33 is provided with a conical opening 37 for frictional and cooperating engagement with the conical shaped end 48 of arm 46. Compression spring 39, having one of its ends abutting shoulder 41 on arm 46 and its other end abutting against plug 43 screw-threadedly mounted in arm 33, serves to maintain the conical shaped end 48 of arm 46 in frictional and adjusted position with walls defining conical shaped opening 37. It is noted that the diameter of shoulder 41 is made somewhat smaller than the diameter of the screw-threaded opening of arm 33 for purposes of assembly. A small clearance is provided between screw-threaded spring retaining plug 43 and arm 46 for allowing arm 46 to move relatively easily with respect to arm 33.

The sunshade 40 is frictionally held in adjusted position on arm 46 by means of a pair of clamping members 42 and 45 screw-threadedly held on the sunshade 40 with a pair of resilient members 44 interposed therebetween as shown in Fig. 6. With this construction it is readily seen that the sunshade 40 may be manually adjusted with respect to and on supporting shaft 46 and that the resilient members 44 help maintain the shade in adjusted position.

One feature of the present invention is that the shades proper are universal in application in that any particular one may be mounted on the left or right-hand side of supporting plate 10. Furthermore, it is seen that such sunshade proper may be easily assembled and disassembled by providing the removable screw 50 and removable plug 43.

In order that the sunshade 40 and its mounting in sun obscuring and retracted positions detract little from the artistic appearance of the header plate 10 and do not block or deflect sounds passing through the sound openings in header plate 10, the base member is preferably mounted on a line passing through the horizontal centers of sets of openings 19 and 20 with arm 33 substantially greater than one-half the vertical dimension of header plate 10. In such case, when the sunshade 40 is in retracted position as shown on the left-hand side of Fig. 1, or when the sunshade 40 is in sun obscuring position as shown in Fig. 1 or 5, the sunshade and its mounting produce no undesirable acoustic or appearance effects. Furthermore, knobs 15 and 16 can always be reached. In general and as shown in the preferred embodiment herein, it is desirable to have the axis of rotation of bearing member 32 and the axis of rotation of sunshade 40 extend substantially parallel and with the perpendicular distance between such axes substantially greater than one-half the vertical distance of header plate 10.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In an automobile, a header plate, radio apparatus mounted on the header plate, a sound opening through the header plate for sound emanating from said apparatus, a control knob mounted within said automobile contiguous to the header plate and arranged to control said apparatus, a sunshade support mounted adjacent said opening on the plate, a first arm rotatably mounted in said support, the axis of rotation of said first arm being substantially coincident with a horizontal line passing through the horizontal center of said opening, a second arm rotatably mounted within said first arm, a sunshade adjustably mounted on said second arm, said opening and header plate being arranged to allow transmission of substantially all of the sound through said opening and space within which the sunshade may be positioned wherein said sunshade blocks ready access to said control knob to a person sitting on the front seat of said automobile, said second arm having a length greater than half the vertical dimension of said opening whereby said sunshade may be positioned either in a position above said opening or in a position below said opening wherein the sunshade produces no interference to said transmission of sound or to operation of said control knob.

2. In an automobile, a header plate, manually operable control apparatus including a control knob mounted on the header plate, a sound opening through the header plate for sound emanating from said apparatus, a sunshade support mounted adjacent said opening on the plate, a first arm rotatably mounted on said support, the axis of rotation of said first arm being substantially coincident with a horizontal line passing through the horizontal center of said opening, a second arm rotatably mounted on said first arm, a sunshade adjustably mounted on said second arm, said opening being arranged to allow transmission of substantially all of the sound through said opening and space within which the sunshade may be positioned wherein said sunshade blocks ready access to said control knob to a person sitting on the front seat of the automobile, said second arm having a length greater than half the vertical dimension of said opening whereby the sunshade in its retracted or sun obscuring position produces no interference to the manual operation of said control apparatus or to sound emanating from said apparatus.

3. In a vehicle, an enclosure defining a header space, a speaker and speaker control knob mounted near each other on said enclosure with said speaker lying within said header space, said enclosure having an opening directed toward the inside of said vehicle for the passage of sound from said speaker, a first arm, means for supporting said first arm in said vehicle near said opening for rotation about a first substantially horizontal axis at a large angle to said first arm and with said first axis passing across said opening, a second arm rotatably mounted on said first arm for rotation thereon about an axis substantially perpendicular to the first axis, and a sunshade supported on said second arm, whereby motion of said sunshade about said first axis may place said sunshade over said opening to obscure sound therefrom and interfere with operation of said knob, said first arm having sufficient length that the distance from said sunshade to said first axis is at least equal to half the dimension of said opening transverse to said first axis thereby to avoid obscuring sound from said opening when said sunshade lies either in operative or retracted position.

4. In combination, an automobile having a header space, an artistic plate enclosing said header space, radio apparatus mounted on said plate, a control knob mounted within said automobile contiguous to said artistic plate and arranged to control said apparatus, a sound opening through the header plate for sound emanating from said apparatus, a sunshade supporting member mounted adjacent said opening on said plate, a first arm having one of its ends journaled frictionally in said supporting member about a first axis, the axis of rotation of said first arm being substantially coincident with a horizontal line passing through the horizontal center of said opening, a second arm journaled frictionally in the other end of said first arm, and a sunshade rotatably and frictionally mounted on said second arm about a second axis, said opening being arranged to allow transmission of substantially all of the sound through said opening and space within which the sunshade may be positioned wherein said sunshade blocks ready access to said control knob to a person sitting on the front seat of said automobile, said first and second axes being substantially parallel and the perpendicular distance between said axes being substantially greater than one-half the vertical distance of said plate whereby the sunshade when in its operative and when in its retracted positions produces substantially no distraction from the artistic appearance of said plate and when in said operative and retracted positions the sunshade produces no interference to said transmission of sound or to operation of said control knob.

CHARLES E. LIPUMA.

REFERENCES CITED

The following references are of record in the file of this patent:

UNITED STATES PATENTS

| Number | Name | Date |
|---|---|---|
| 1,590,203 | Olssen, et al. | June 29, 1926 |
| 1,772,233 | Vivier | Aug. 5, 1930 |
| 1,868,031 | Sudbrink | July 19, 1932 |
| 1,913,277 | Hoople | June 6, 1933 |
| 1,930,577 | Atkinson | Oct. 17, 1933 |
| 2,023,719 | Arrison | Dec. 10, 1935 |
| 2,060,666 | Ellmore | Nov. 10, 1936 |
| 2,069,328 | Rockwell | Feb. 2, 1937 |
| 2,084,584 | Jacobs | June 22, 1937 |
| 2,153,095 | McKinley | Apr. 4, 1939 |
| 2,299,775 | Westrope | Oct. 27, 1942 |
| 2,360,183 | Westrope | Oct. 10, 1944 |